United States Patent
Pline

(10) Patent No.: US 11,453,312 B2
(45) Date of Patent: Sep. 27, 2022

(54) VEHICLE SEAT OPERATION

(71) Applicant: Ford Global Technologies, LLC, Dearborn, MI (US)

(72) Inventor: Kevin Michael Pline, Plymouth, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 462 days.

(21) Appl. No.: 16/360,067

(22) Filed: Mar. 21, 2019

(65) Prior Publication Data

US 2020/0298731 A1   Sep. 24, 2020

(51) Int. Cl.
| | | |
|---|---|---|
| *B60N 2/02* | (2006.01) | |
| *B60R 22/48* | (2006.01) | |
| *B60N 2/14* | (2006.01) | |
| *B60N 2/28* | (2006.01) | |

(52) U.S. Cl.
CPC ......... *B60N 2/0244* (2013.01); *B60N 2/0232* (2013.01); *B60N 2/14* (2013.01); *B60N 2/2863* (2013.01); *B60R 22/48* (2013.01); *B60N 2002/0272* (2013.01); *B60R 2022/4858* (2013.01)

(58) Field of Classification Search
CPC .......... B60N 2/0244; B60N 2002/0272; B60N 2/0232; B60N 2/14; B60N 2/2863; B60N 2/2821; B60N 2002/2815; B60N 2/829; B60N 2/853; B60N 2/28; B60N 2/2806; B60N 2/2869; B60N 2002/022; B60R 21/01516; B60R 21/0152; B60R 22/48; B60R 2022/4858; B60R 21/01534; B60R 21/01554; B60R 2001/1223; B60R 21/01544; B60R 16/037; B60R 21/01556; B60R 21/015; B60R 21/0155; B60R 2022/4841; B60R 22/022; F15B 2211/765; F16D 2500/7041; G05G 5/05–26; G01D 5/3473; G01D 3/00; G05B 2219/41118–41122
See application file for complete search history.

(56) References Cited

U.S. PATENT DOCUMENTS

| | | | |
|---|---|---|---|
| 3,572,817 A | * | 3/1971 | Colautti .............. B60N 2/146 296/65.13 |
| 6,382,667 B1 | * | 5/2002 | Aoki ............. B60R 21/01556 701/45 |
| 6,678,600 B2 | | 1/2004 | Basir et al. |
| 7,159,686 B2 | | 1/2007 | Martinez et al. |
| 7,233,239 B2 | | 6/2007 | Chitalia et al. |
| 9,096,150 B2 | | 8/2015 | Cuddihy et al. |
| 9,821,681 B2 | | 11/2017 | Rao et al. |

(Continued)

OTHER PUBLICATIONS

Danielle Collins, "FAQ: What are servo feedback gains, overshoot limits, and position error limits?", Mar. 22, 2016, https://www.motioncontroltips.com (Year: 2016).*

(Continued)

*Primary Examiner* — Ig T An
(74) *Attorney, Agent, or Firm* — Frank A. MacKenzie; Bejin Bieneman PLC

(57) ABSTRACT

A computer includes a processor and a memory, the memory storing instructions executable by the processor to identify a child seat mounted to a vehicle seat and, then, to rotate the vehicle seat to a forward position.

16 Claims, 6 Drawing Sheets

(56) References Cited

U.S. PATENT DOCUMENTS

| | | | |
|---|---|---|---|
| 10,065,529 B1 | 9/2018 | Miranda Nieto et al. | |
| 2005/0189805 A1 | 9/2005 | Burley et al. | |
| 2005/0280297 A1 | 12/2005 | Patterson et al. | |
| 2007/0164592 A1* | 7/2007 | Gerhardt | B60N 2/0232 |
| | | | 297/344.23 |
| 2009/0160229 A1* | 6/2009 | Mabuchi | B60N 2/01 |
| | | | 297/217.3 |
| 2009/0167067 A1 | 7/2009 | Decoster et al. | |
| 2016/0288670 A1* | 10/2016 | Johnson | B60N 2/28 |
| 2018/0281625 A1* | 10/2018 | Akaba | B60N 2/14 |
| 2019/0054841 A1* | 2/2019 | Cech | B60N 2/2806 |
| 2019/0084517 A1* | 3/2019 | Iyer | B60R 21/214 |
| 2019/0299897 A1* | 10/2019 | Gramenos | B60N 2/4235 |
| 2019/0299925 A1* | 10/2019 | Shi | B60N 2/2857 |

OTHER PUBLICATIONS

Danielle Collins, "Why use brushed servo motors?", May 11, 2017, https://www.motioncontroltips.com (Year: 2017).*

David Kaiser, "Fundamentals of Servo Motion Control", 2001 (Year: 2001).*

* cited by examiner

VEHICLE SEAT OPERATION

BACKGROUND

Child seats support children in vehicle seats. The child seats may face in a vehicle-forward direction or a vehicle-rearward direction when installed to the vehicle seats. Child seats facing in the vehicle-rearward direction may be used for supporting infants. Vehicle seats may be rotatable away from the vehicle-forward direction, e.g., toward a center of a passenger cabin, toward a rear row of vehicle seats, etc.

Child seats typically require specific installation to vehicle seats. For example, Federal Motor Vehicle Safety Standard (FMVSS) 213 specifies installation and restraint systems for securing child seats to vehicle seats. FMVSS 213 further provides child restraint standards for child seats designed to support children up to 80 pounds. Child seat installation to a vehicle seat assumes that the vehicle seat faces the vehicle-forward direction.

DETAILED DESCRIPTION

Figure 1:
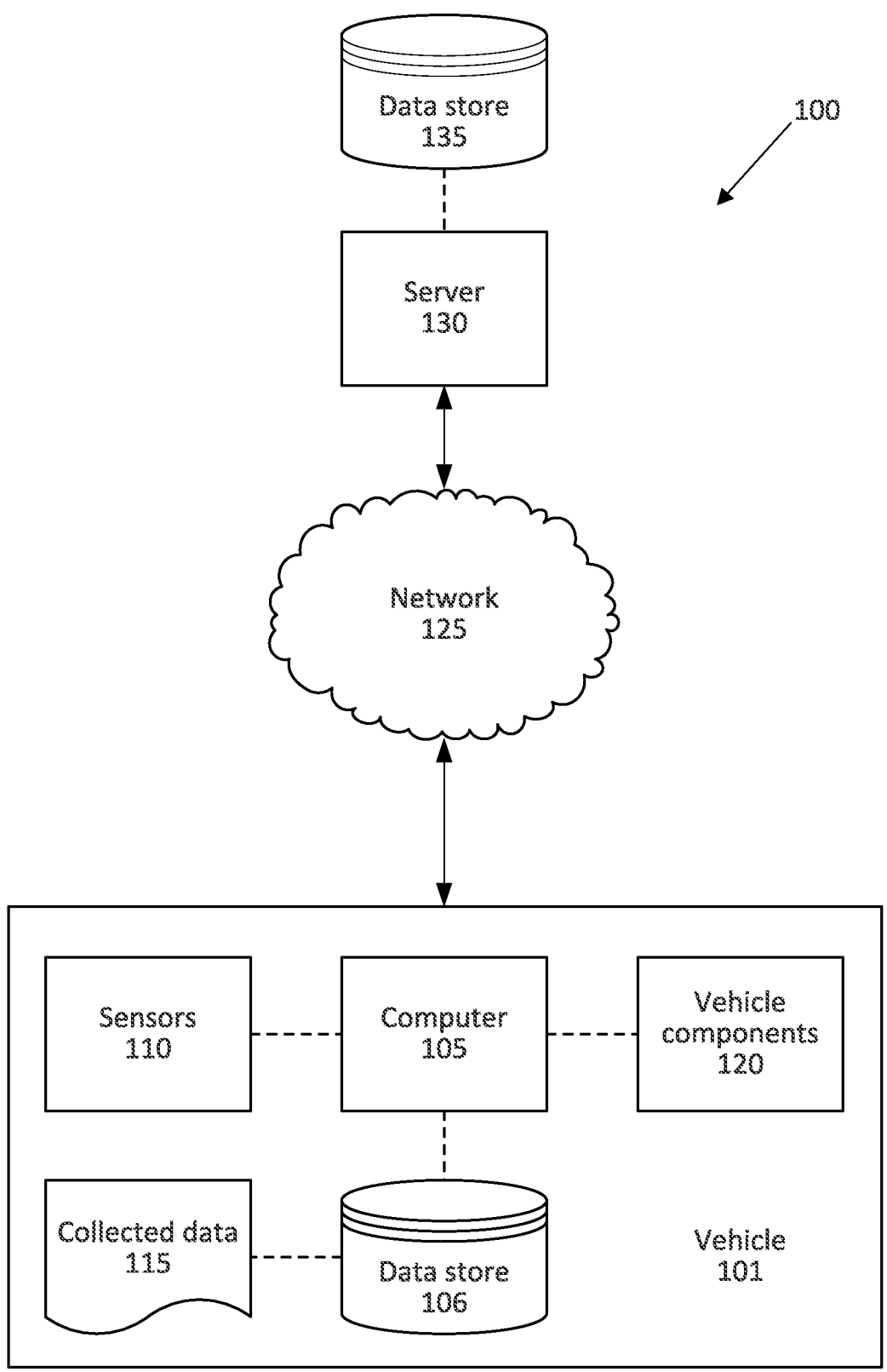
FIG. 1 is a block diagram of a system for rotating a vehicle seat with a child seat.

A system includes a computer including a processor and a memory, the memory storing instructions executable by the processor to identify a child seat mounted to a vehicle seat and, then, rotate the vehicle seat to a forward position.

The instructions may further include instructions to, upon identifying the child seat, prevent the vehicle seat from rotating away from the forward position.

The instructions may include instructions to identify the child seat when a weight applied to the vehicle seat exceeds a weight threshold and a tension of a seat belt of the vehicle seat exceeds a tension threshold.

The instructions may further include instructions to identify the child seat when a load cell detects a load from the child seat greater than a load threshold.

The child seat may include a connector connectable to the load cell.

The instructions may further include instructions to provide an output to a vehicle occupant when, upon identifying the child seat, the vehicle seat is not in the forward position.

The instructions may further include instructions to determine an angular position of the vehicle seat and to rotate the vehicle seat until the angular position is within an angle range.

The vehicle seat may include a rotator and a bottom, the rotator mounted to the bottom.

The instructions may further include instructions to actuate a motor to rotate the rotator to the forward position.

The child seat may be a rear-facing child seat facing a seat back of the vehicle seat.

The instructions may further include instructions to rotate the vehicle seat to a first angular position upon receiving a user input to mount the child seat and, upon identifying the child seat mounted to the vehicle seat, to rotate the vehicle seat to the forward position.

The forward position may be a range of angular positions about an axis of the vehicle seat in a substantially vehicle-forward direction.

A method includes identifying a child seat mounted to a vehicle seat and, then, rotating the vehicle seat to a forward position.

The method may further include, upon identifying the child seat, preventing the vehicle seat from rotating away from the forward position.

The method may further include identifying the child seat when a weight applied to the vehicle seat exceeds a weight threshold and a tension of a seat belt of the vehicle seat exceeds a tension threshold.

The method may further include identifying the child seat when a load cell detects a load from the child seat greater than a load threshold.

The method may further include providing an output to a vehicle occupant when, upon identifying the child seat, the vehicle seat is not in the forward position.

The method may further include determining an angular position of the vehicle seat and rotating the vehicle seat until the angular position is within an angle range.

The method may further include actuating a motor to rotate the rotator to the forward position.

The method may further include rotating the vehicle seat to a first angular position upon receiving a user input to mount the child seat and, upon identifying the child seat mounted to the vehicle seat, rotating the vehicle seat to the forward position.

A system includes a vehicle seat rotatable to a forward position, means for identifying a child seat mounted to the vehicle seat, and means for rotating the vehicle seat to the forward position upon identifying the child seat.

The system may further include means for preventing the vehicle seat from rotating away from the forward position upon identifying the child seat.

The system may further include means for identifying the child seat when a weight applied to the vehicle seat exceeds a weight threshold and a tension of a seat belt of the vehicle seat exceeds a tension threshold.

The system may further include means for providing an output to a vehicle occupant when, upon identifying the child seat, the vehicle seat is not in the forward position.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Rotating a vehicle seat in a vehicle to a forward position upon identifying a child seat installed to the vehicle seat ensures that the child seat is positioned correctly relative to a vehicle-forward direction without further input from a vehicle occupant installing the child seat. Preventing the vehicle seat from rotating away from the forward position ensures continued correct positioning of the child seat. When a vehicle occupant rotates the vehicle seat with the installed child seat away from the vehicle-forward direction, a computer in the vehicle can rotate the vehicle seat to the vehicle-forward position.

Current methods of child seat installation systems include vehicle seat belts and/or anchor systems, e.g., Lower Anchors and Tethers for CHildren (LATCH) systems. The computer in the vehicle can detect the installation of the child seat with the seat belt based on occupant classification systems, e.g., weight sensors, seat belt tension sensors, etc. Upon detecting the child seat and/or that a vehicle occupant is a child, the computer can deactivate one or more airbags, e.g., a passenger airbag. The computer in the vehicle can detect the child seat with the LATCH system, e.g., based on data from a sensor of the LATCH system connected to the child seat.

FIG. 1 illustrates a system 100 for rotating a vehicle seat with a child seat. The system 100 includes a computer 105. The computer 105, typically included in a vehicle 101, is programmed to receive collected data 115 from one or more sensors 110. For example, vehicle 101 data 115 may include a location of the vehicle 101, data about an environment around a vehicle 101, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, or the like.

When the computer 105 partially or fully operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
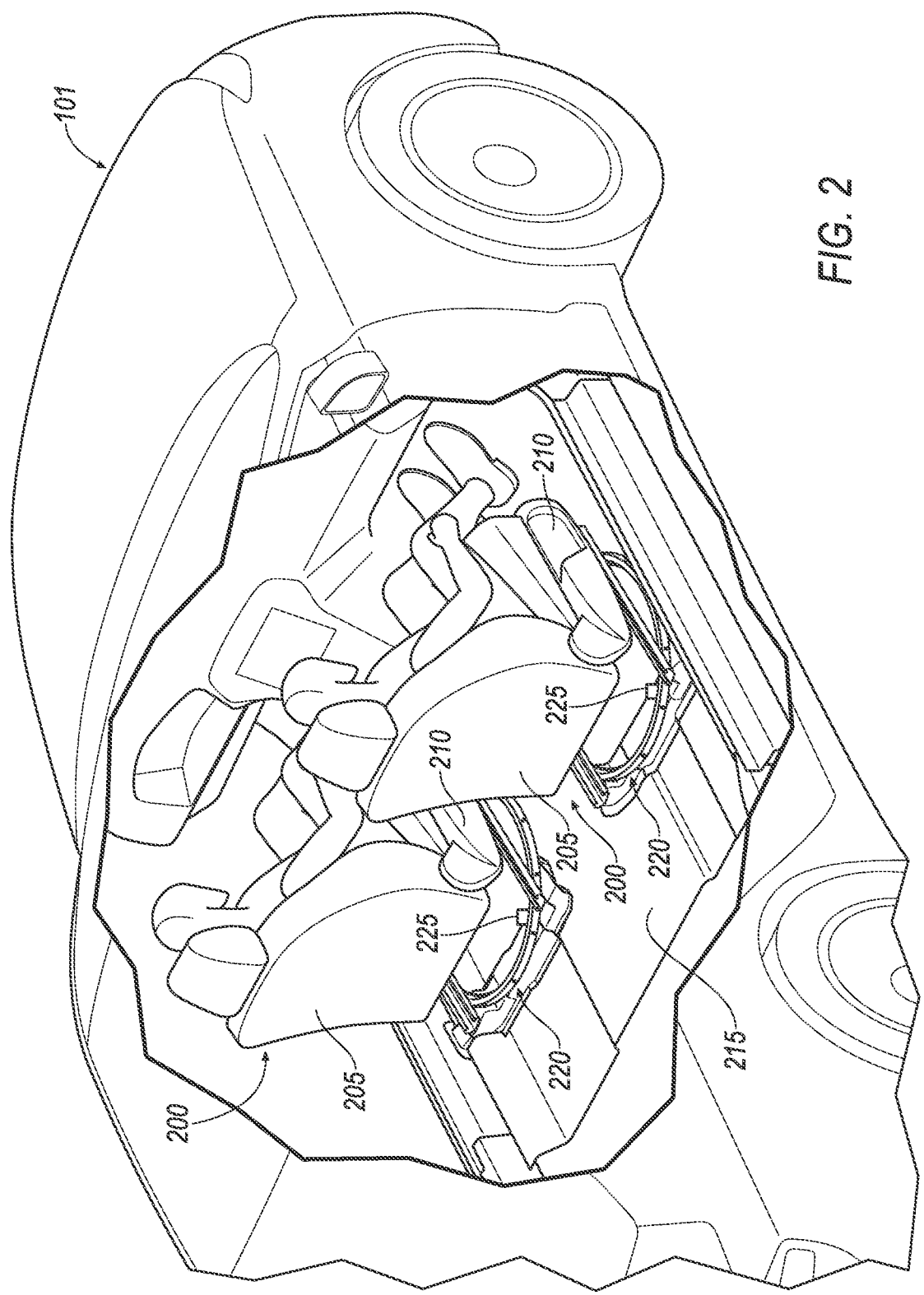
FIG. 2 is a perspective view of a vehicle including a plurality of rotatable vehicle seats.

FIG. 2 is a perspective view of the vehicle 101. The vehicle 101 includes a plurality of seats 200. Each seat includes a respective seat back 205 and seat bottom 210. The seat back 205 may be supported by the seat bottom 210 and may be stationary or movable relative to the seat bottom 210. The seat back 205 and the seat bottom 210 may be adjustable in multiple degrees of freedom. Each seat 200 is supported by a vehicle floor 215. Each seat 200 is rotatable relative to the vehicle floor 215.

Each seat 200 includes a rotator 220. The rotator 220 is disposed between the seat bottom 210 and the floor 215. The rotator 220 may be mounted to the seat bottom 210. The rotator 220 may be designed to rotate the seat 200 to a specified angular position. For example, the rotator 220 may include a first ring fixed to the floor 215 and a second ring fixed to the bottom 210 and rotatable relative to the first ring. In another example not shown in the Figures, the rotator 220 may include a post mounted to the seat bottom 210, the post rotatable about an axis.

Each seat 200 includes a motor 225. The computer 105 actuates the motor 225 to rotate the rotator 220. The motor 225 rotates the rotator 220 to move the seat 200 a specified angular position, e.g., the forward position. For example, the motor 225 may move the second ring about the first ring to the specified angular position.

Figure 3:
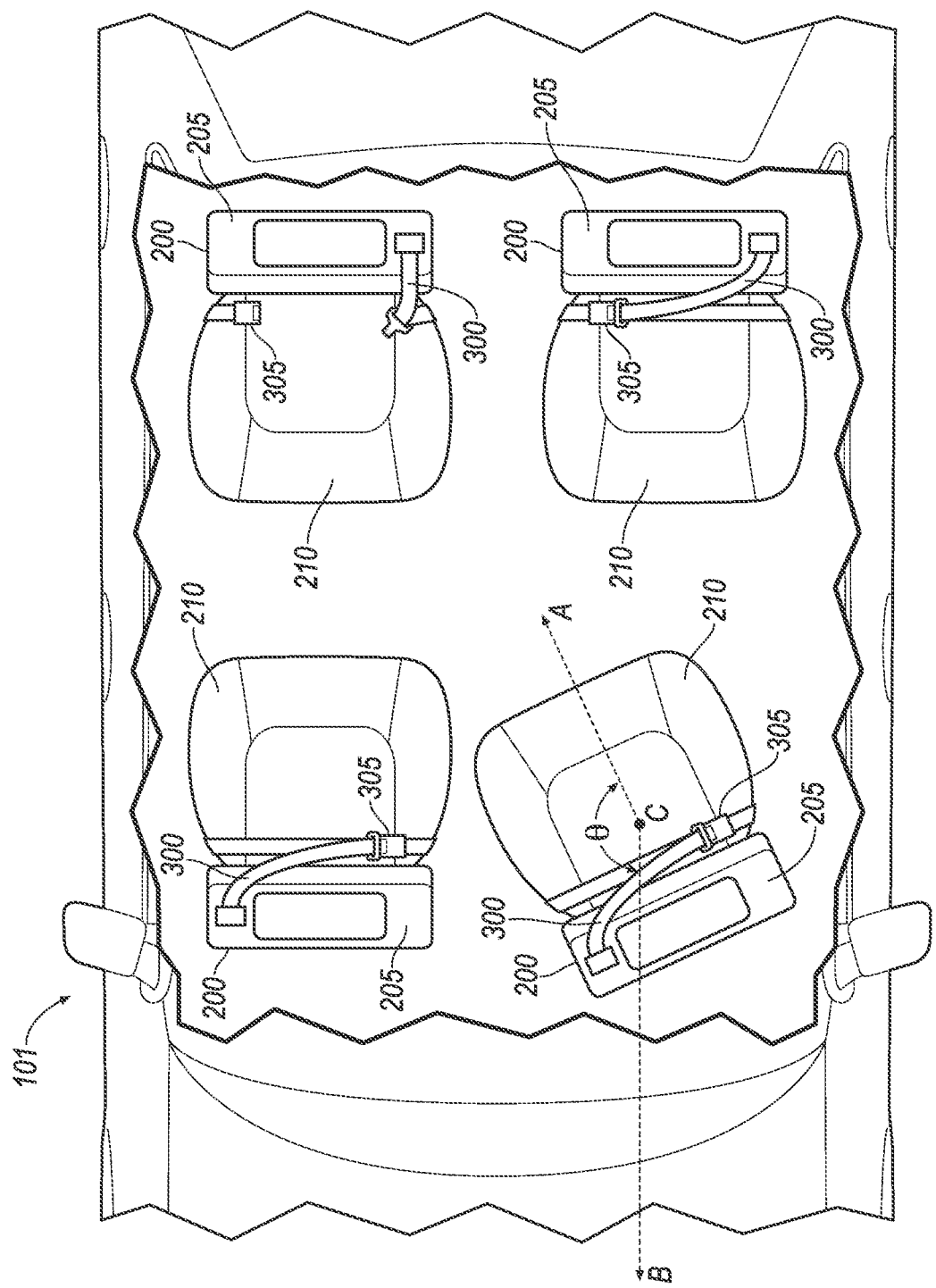
FIG. 3 is a plan view of the vehicle including the plurality of rotatable vehicle seats.

FIG. 3 is a plan view of the vehicle 101. The vehicle 101 includes a plurality of seats 200. The seats 200 are rotatable to a specified angular position θ. In this context, an "angular position" θ is an angle that an axis A extending from the seat defines with a forward axis B about an axis C extending vertically from the seat 200, measured in degrees. The forward axis B extends in a vehicle-forward direction regardless of the rotation of the seat 200. The axes A, B, C share an origin in the seat 200, e.g., on the seat bottom 210 at a center of rotation of the rotator 220. Each seat 200 may be rotated to a respective angular position θ. The seat 200 is rotatable to the forward position. In this context, the "forward position" is a range of angular positions about the axis C of the seat 200 in a substantially vehicle-forward direction. For example, the forward position may be defined as angular positions θ between −5 and 5 degrees.

Each seat 200 is independently rotatable. For example, as shown in FIG. 3, two of the seats 200 may face in a vehicle-rearward direction toward two of the seats 200 facing in a vehicle-forward direction. In another example, each seat 200 may be rotated to a different angular position θ. When the computer 105 operates the vehicle 101 in the autonomous mode, the rotatable seat 200 allow occupants to rotate away from the vehicle-forward direction, e.g., to interact with occupants in other seats 200.

Each seat 200 includes a seat belt 300 and a buckle 305. The seat belt 300 secures a vehicle occupant to the seat 200 when mounted to the buckle 305. The seat belt 300 secures a child seat to the seat 200, as described below. The seat belt 300 and the buckle 305 shown in FIG. 3 are part of a three-point harness, having three mounting points on the seat 200. For example, the three-point harness may have a first mounting point at a top of the seat back 205, a second mounting point on a left side of the seat bottom 210, and a third mounting point on a right side of the seat bottom 210. Alternatively, the seat belt 300 and the buckle 305 may be part of, e.g., a four-point harness, a five-point harness, etc. The seat belt 300 and the buckle 305 are designed to secure the occupant to the seat 200 in any angular position θ. That is, the seat belt 300 and the buckle 305 rotate with the seat 200 such that the occupant remains secured to the seat 200 in any angular position θ.

Figure 4:
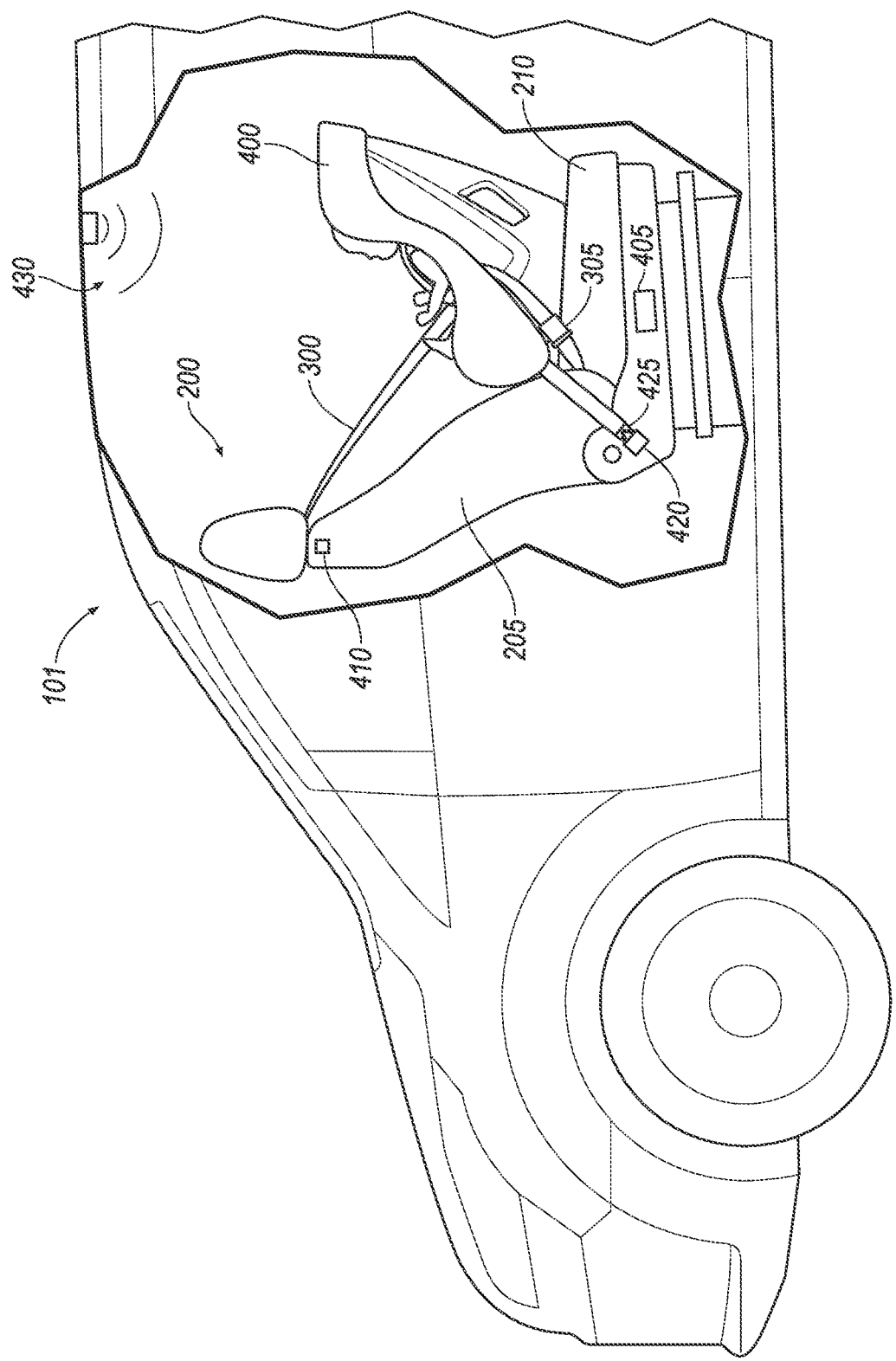
FIG. 4 is a side view of the vehicle including a child seat mounted to one of the vehicle seats.

FIG. 4 is a side view of one of the seats 200 and a child seat 400. The child seat 400 is a rear-facing child seat, i.e., the child seat 400 is designed to protect a child facing a rear of the vehicle 101. When the child seat 400 is mounted to the seat 200, the child seat 400 faces the seat back 205. In FIG. 4, the seat 200 is facing away from the forward position, and the child seat 400 is facing away from a rearward direction of the vehicle 101.

The computer 105 can identify that the child seat 400 is mounted to the seat 200. For example, the computer 105 can identify the child seat 400 when a weight applied to the seat exceeds a weight threshold and a tension of the seat belt 300 exceeds a tension threshold. The seat 200 can include a weight sensor 405 and a tension sensor 410. The weight sensor 405 detects weight applied to the seat bottom 210. The tension sensor 410 detects tension in the seat belt 300. When the child seat 400 is mounted to the seat 200, the child seat 400 increases weight applied to the seat bottom 210, and the weight threshold can be determined based on a weight of the child seat 400. To mount the child seat 400 to the seat 200, the seat belt 300 may pass through a portion of the child seat, increasing tension in the seat belt 300. The tension threshold can be determined based on empirical testing of seat belt tension upon mounting child seats 400 to tested vehicle seats 200.

In another example, the computer 105 may identify the child seat 400 when a load cell 420 installed in the seat 200 detects a load from the child seat 400 greater than a load threshold. The load cell 420 may be, e.g., a strain gauge, a load sensor, etc., of a LATCH system. The child seat 400 can include a connector 425. The connector 425 is connectable to the load cell 420. For example, the load cell 420 may include a loop and the connector 425 may include a hook received by the loop and a strap extending from the child seat 400. When the connector 425 is connected to the load cell 420, the child seat 400 imparts a force through the connector 425 detectable by the load cell 420. The computer 105 compares the load from the force to a load threshold, the load threshold determined based on empirical testing of loads provided by child seats 400 when mounted to tested vehicle seats 200.

Upon identifying the child seat 400, the computer 105 may provide an output 430 to a vehicle occupant when the seat 200 is not in the forward position. As described above, the child seat 400 is designed to be mounted to a forward-facing seat. When the seat 200 is not in the forward position, the computer 105 may provide the output 430 to the vehicle occupant. For example, the computer 105 may provide an audio output over a speaker indicating that the seat 200 is not in the forward position. In another example, the computer 105 may provide a haptic alert in an occupant wearable device. In another example, the computer 105 may provide a visual alert on a display. The computer 105 may continue to provide the output 430 until detecting that the seat 200 is in the forward position.

Figure 5:
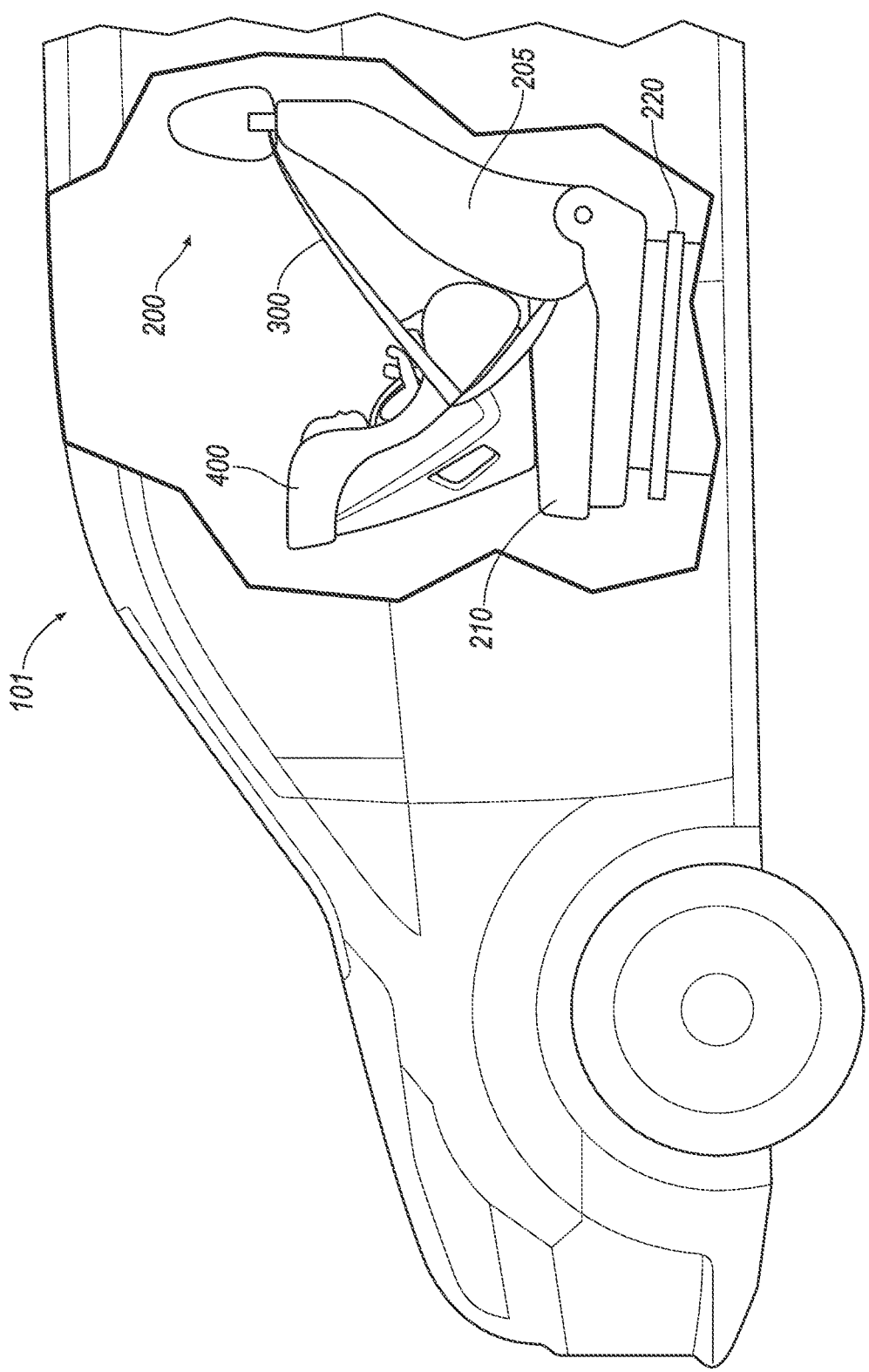
FIG. 5 is a side view of the vehicle with the vehicle seat in the forward position.

FIG. 5 is a side view of the vehicle 101 with the seat 200 in the forward position. When the seat 200 is in the forward position, the rear-facing child seat 400 faces the rearward direction of the vehicle 101 and is positioned to protect the child in the child seat 400.

The computer 105 can rotate the seat 200 to the forward position upon identifying the child seat 400. The computer 105 can determine the angular position θ of the seat 200, e.g., with an angular sensor 110. If the angular position θ is away from the forward position, the computer 105 can actuate the motor 225 to rotate the seat 200 until the angular position θ is in the forward position, i.e., within the angle range defining the forward position.

The computer 105 can, upon identifying the child seat 400, prevent the seat 200 from rotating away from the forward position. The computer 105 can, upon identifying the child seat 400 and rotating the seat 200 to the forward position, ignore user input to rotate the seat 200 and can determine not to actuate the rotator 220 upon receiving user input. Alternatively or additionally, the computer 105 can actuate a lock (not shown) that prevents rotation of the seat 200 from the forward position. For example, the lock may prevent motion of the second ring relative to the first ring, preventing the seat 200 from rotating away from the forward position.

To assist in mounting the child seat 400 to the seat 200, the computer 105 can rotate the seat 200 to a first angular position upon receiving a user input to mount the child seat 400. The first angular position can be, e.g., toward a vehicle door opening. In the first angular position, the occupant can mount the child seat 400 to the seat 200. Then, upon identifying the child seat 400 mounted to the seat 200, the computer 105 can rotate the seat 200 to the forward position.

The system 100 includes means for identifying the child seat 400 mounted to the vehicle seat 200. Examples of such means include the computer 105, the sensors 110, the weight sensor 405, the tension sensor 410, the load cell 420, and functional equivalents thereof.

The system 100 includes means for rotating the vehicle seat 200 to the forward position upon identifying the child seat 400. Examples of such means include the rotator 220 and functional equivalents thereof.

The system 100 includes means for preventing the vehicle seat 200 from rotating away from the forward position upon identifying the child seat 400. Examples of such means include the computer 105, the lock, and functional equivalents thereof.

The system 100 includes means for identifying the child seat 400 when a weight applied to the vehicle seat 200 exceeds a weight threshold and a tension of a seat belt 300 of the vehicle seat 200 exceeds a tension threshold. Examples of such means include the computer 105, the weight sensor 405, the tension sensor 410, and functional equivalents thereof.

The system 100 includes means for providing the output 430 to a vehicle occupant when, upon identifying the child seat 400, the vehicle seat 200 is not in the forward position. Examples of such means include the computer 105, a speaker, an indicator light, a display, a wearable device, a haptic device, and functional equivalents thereof.

Figure 6:
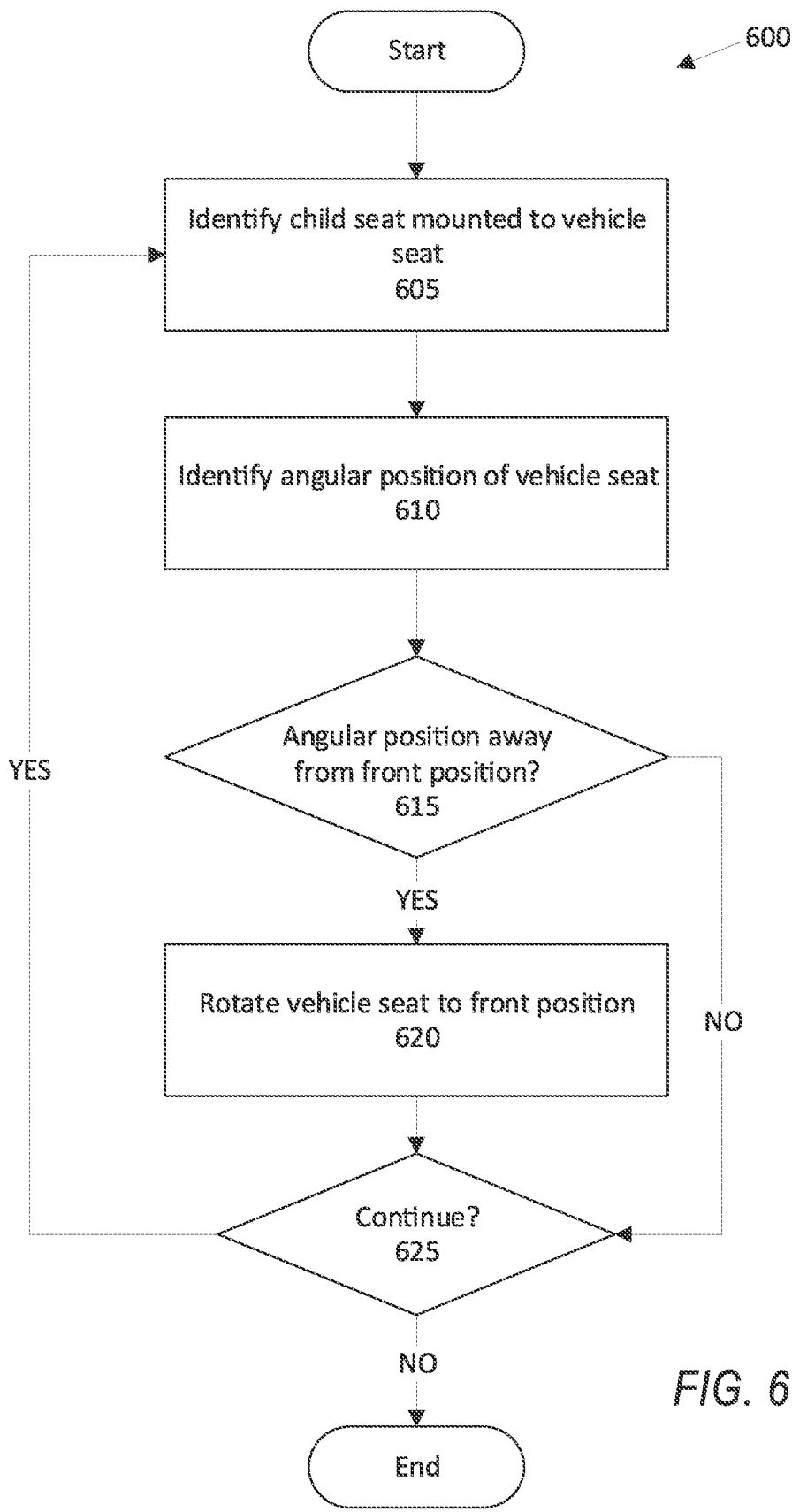
FIG. 6 is a block diagram of a process for rotating a vehicle seat with a child seat.

FIG. 6 is a block diagram of an example process 600 for rotating a seat 200 with a child seat 400. The process 600 begins in a block 605, in which the computer 105 identifies the child seat 400 mounted to the seat 200. As described above, the computer 105 may identify the child seat 400 mounted to the seat 200 based on a load from a connector 425 of the child seat 400 detected by a load cell 420 of the seat 200.

Next, in a block 610, the computer 105 identifies an angular position θ of the seat 200. As described above, the angular position θ is an angle defined between an axis A of the seat and a forward axis B. The angular position θ indicates a position of the seat 200 away from a vehicle-forward direction.

Next, in a block 615, the computer 105 determines whether the angular position θ is away from the forward position. As described above, the forward position is an angle range, e.g., −5 to 5 degrees, and when the angular position θ is not within the angle range, the seat 200 is not in the forward position. If the angular position is away from the front position, the process 600 continues in a block 620. Otherwise, the process 600 continues in a block 625.

In the block 620, the computer 105 rotates the seat 200 to the forward position. As described above, the computer 105 can actuate a rotator 220 to rotate the seat 200 until the angular position θ is within the angle range defined by the forward position. When the seat 200 is in the forward position, the computer 105 can prevent further rotation of the seat 200 away from the forward position.

In the block 625, the computer 105 determines whether to continue the process 600. For example, the computer 105 can determine to continue the process 600 upon identifying one or more child seats 400. If the computer 105 determines to continue, the process 600 returns to the block 605. Otherwise, the process 600 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 600, one or more of the steps could be omitted, or the steps could be executed in a different order than shown in FIG. 6. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising a computer including a processor and a memory, the memory storing instructions executable by the processor to:
   identify a child seat mounted to a vehicle seat;
   identify an angular position of the vehicle seat based on data from an angular sensor;
   determine that the angular position of the vehicle seat is away from a forward position based on data from the angular sensor, the forward position being a specified angle range of the angular position of the vehicle seat;
   then, actuate a motor to rotate the vehicle seat until data from the angular sensor indicate that the angular position of the vehicle seat is within the specified angle range of the forward position; and
   upon identifying the child seat, prevent the vehicle seat from rotating away from the forward position.

2. The system of claim 1, wherein the instructions further include instructions to identify the child seat when a weight applied to the vehicle seat exceeds a weight threshold and a tension of a seat belt of the vehicle seat exceeds a tension threshold.

3. The system of claim 1, wherein the instructions further include instructions to identify the child seat when a load cell detects a load from the child seat greater than a load threshold.

4. The system of claim 3, wherein a child seat includes a connector connectable to the load cell.

5. The system of claim 1, wherein the instructions further include instructions to provide an output to a vehicle occupant when, upon identifying the child seat, the vehicle seat is not in the forward position.

6. The system of claim 1, wherein the vehicle seat includes a rotator and a bottom, the rotator mounted to the bottom.

7. The system of claim 6, wherein the instructions further include instructions to actuate the motor to rotate the rotator to the forward position.

8. The system of claim 1, wherein a child seat is a rear-facing child seat facing a seat back of the vehicle seat.

9. The system of claim 1, wherein the instructions further include instructions to rotate the vehicle seat to a first angular position upon receiving a user input to mount the child seat and, upon identifying the child seat mounted to the vehicle seat, to rotate the vehicle seat to the forward position.

10. The system of claim 1, wherein the forward position is a range of angular positions about an axis of the vehicle seat in a substantially vehicle-forward direction.

11. A method, comprising:
    identifying a child seat mounted to a vehicle seat;
    identifying an angular position of the vehicle seat based on data from an angular sensor;
    determining that the angular position of the vehicle seat is away from a forward position based on data from the angular sensor, the forward position being a specified angle range of the angular position of the vehicle seat;
    then, actuating a motor to rotate the vehicle seat until data from the angular sensor indicate that the angular position of the vehicle seat is within the specified angle range of the forward position; and
    upon identifying the child seat, preventing the vehicle seat from rotating away from the forward position.

12. The method of claim 11, further comprising identifying the child seat when a weight applied to the vehicle seat exceeds a weight threshold and a tension of a seat belt of the vehicle seat exceeds a tension threshold.

13. The method of claim 11, further comprising providing an output to a vehicle occupant when, upon identifying the child seat, the vehicle seat is not in the forward position.

14. A system, comprising:
    a vehicle seat rotatable to a forward position, the forward position being a specified angle range of an angular position of the vehicle seat;
    means for determining that the angular position of the vehicle seat is away from the forward position based on data from an angular sensor;
    means for identifying a child seat mounted to the vehicle seat; and
    means for actuating a motor to rotate the vehicle seat until data from the angular sensor indicate that the angular position is within the specified angle range of the forward position upon identifying the child seat; and
    means for preventing the vehicle seat from rotating away from the forward position upon identifying the child seat.

15. The system of claim 14, further comprising means for identifying the child seat when a weight applied to the vehicle seat exceeds a weight threshold and a tension of a seat belt of the vehicle seat exceeds a tension threshold.

16. The system of claim 14, further comprising means for providing an output to a vehicle occupant when, upon identifying the child seat, the vehicle seat is not in the forward position.

* * * * *